R. W. CHEEK.
HAND PROPELLED VEHICLE.
APPLICATION FILED JULY 24, 1918.

1,297,796.

Patented Mar. 18, 1919.
3 SHEETS—SHEET 1.

Witnesses
R. A. Thomas

Inventor
R. W. Cheek
By Victor J. Evans
Attorney

Witnesses
R. A. Thomas

Inventor
R. W. Cheek
By Victor J. Evans
Attorney

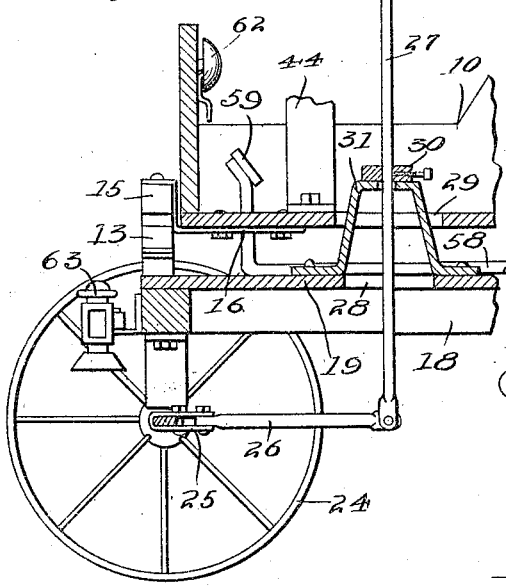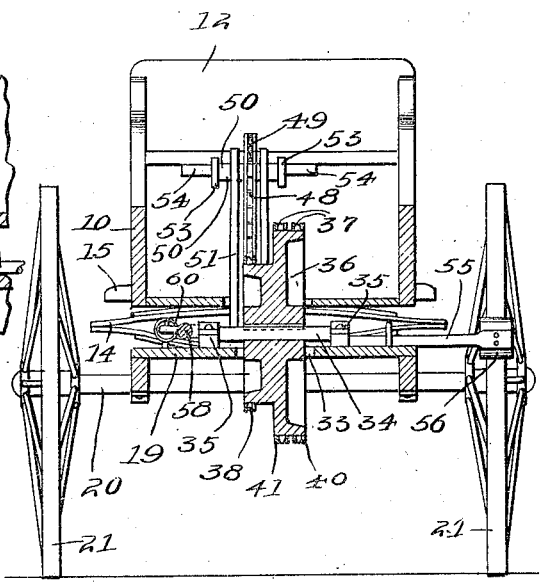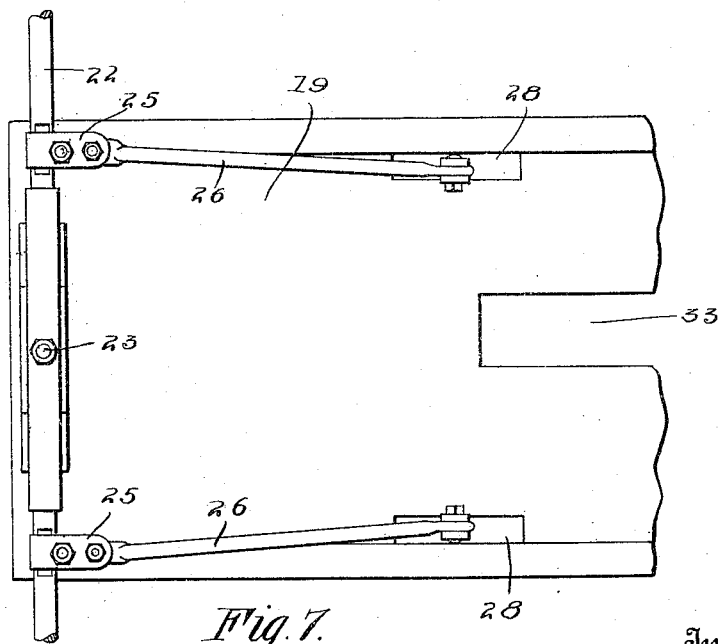

UNITED STATES PATENT OFFICE.

REUBEN W. CHEEK, OF BUFORD, GEORGIA.

HAND-PROPELLED VEHICLE.

1,297,796.

Specification of Letters Patent.  Patented Mar. 18, 1919.

Application filed July 24, 1918. Serial No. 246,488.

*To all whom it may concern:*

Be it known that I, REUBEN W. CHEEK, a citizen of the United States, residing at Buford, in the county of Gwinnett and State of Georgia, have invented new and useful Improvements in Hand-Propelled Vehicles, of which the following is a specification.

This invention relates to hand propelled vehicles and aims to provide a vehicle which is of simple construction and provided with means whereby the driving and guiding mechanism may be operated from the seat or seats.

To this end the invention includes a body mounted upon springs which are supported upon a frame, the latter having secured thereto supporting wheels. This frame also carries the driving mechanism which is operated by front and rear cranks located in advance of the seats which are supported upon the body, while steering levers also supported upon the frame are connected to the front pivoted axle and extend upward through the body into a convenient position.

One of the novel features of the invention resides in mounting all of the above mentioned driving and steering mechanism upon the supporting frame, so that the body will have free vertical movement upon the springs, thereby insuring ease of riding and permitting of the ready substitution of a different form of body if desired.

The invention also contemplates a novel pivotal mounting for the steering levers, the brackets upon which these levers are mounted extending upward through the floor of the body to act as guides for the latter in its vertical movement upon the springs.

Other novel features of the invention will appear as the following detailed description is read in connection with the accompanying drawings.

In the drawings:—

Fig. 4 is a transverse sectional view;

Fig. 6 is a detailed longitudinal sectional view through the frame and body, showing the mounting of the steering members; and Fig. 7 is a bottom plan view of the forward part of the vehicle illustrating the steering connections.

Figure 1:
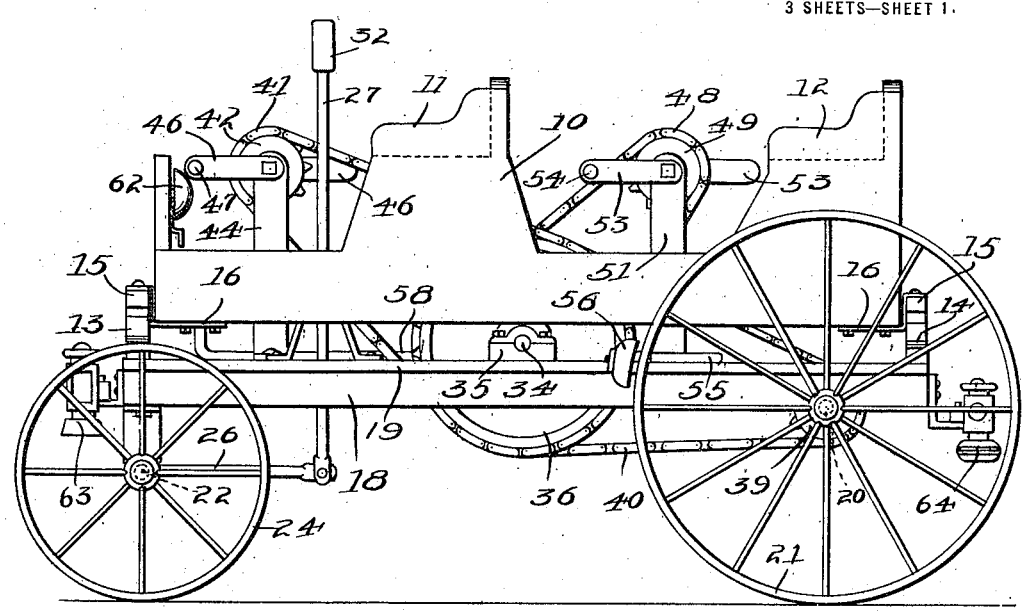
Figure 1 is a side elevation of the vehicle embodying the present invention.
Figure 2:
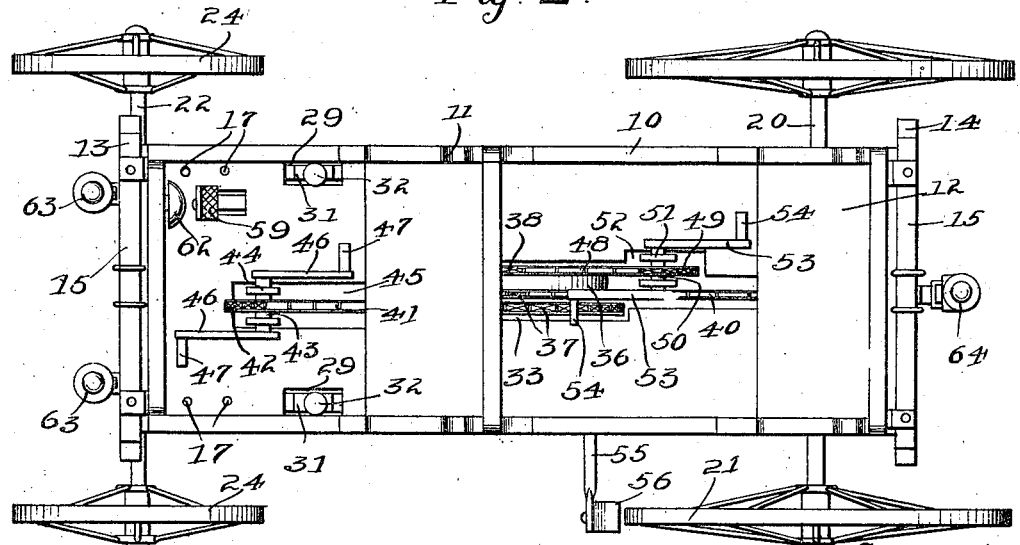
Fig. 2 is a top plan view thereof.
Figure 3:
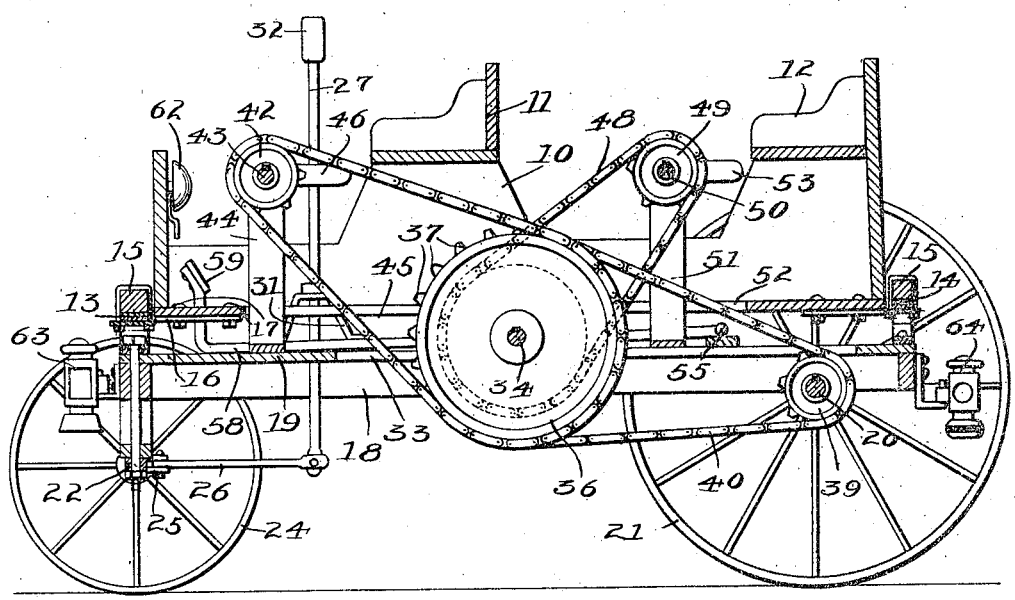
Fig. 3 is a longitudinal sectional view.
Figure 5:
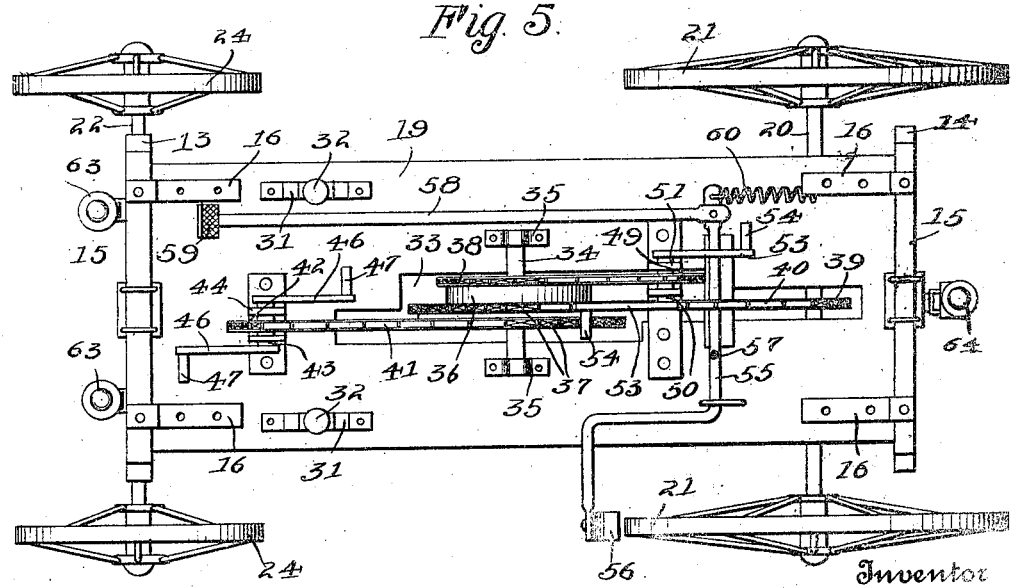
Fig. 5 is a plan view with the body removed.

Referring to the drawings in detail, the body of the vehicle is indicated at 10. This body may be of various shapes and design, the one shown including front and rear seats 11 and 12. The body 10 is supported upon front and rear springs 13 and 14, both of which have secured thereto by means of clips or other fastening devices bolsters 15. These bolsters have secured at each end thereof brackets 16 which extend beneath the bottom of the body and are secured thereto by bolts 17. This provides for the ready removal of the body and substitution of the body of a different form if desired.

The springs 13 and 14 are mounted upon a supporting frame 18, the latter including a platform 19 upon which the springs are mounted. This frame has secured transversely beneath the rear end thereof an axle 20, upon which the driving wheels 21 are mounted. The forward end of the frame 18 has pivotally secured therebeneath an axle 22, this axle being mounted upon a king pin 23 in the usual or any preferred manner. Wheels 24 are mounted upon each end of the axle 22. Pivotally secured upon the axle 22 adjacent the hubs of each of the wheels 24 through the medium of clips 25, is one end of a rod 26. The opposite end of each of these rods has pivotally secured thereto one end of a guiding lever 27, which operates in a slot 28 provided in the platform 19 and extends upward through a slot 29 in the body 10. The guiding lever 27 is pivotally mounted as shown at 30 upon a substantially V-shaped bracket 31 secured upon the platform 19 and extending upward through the slot 29 in the vehicle body, so that in addition to providing a pivotal mounting for the guiding levers 27, the brackets 31 act as guides during the vertical movement of the body upon strings 13 and 14 and retain the said body in its proper position relative to the supporting frame 18. The upper ends of each of the guiding levers 27 are provided with hand grips 32, which are located within convenient reach of the occupants of the front seat 11.

Mounted upon the platform 19 transversely across a slot 33 formed in the said platform, is a shaft 34, this shaft being mounted in suitable bearings 35 and having secured thereto a wheel 36. This wheel is provided with a double row of sprocket teeth 37 upon its periphery and with a relatively small row of sprocket teeth 38. The construction of this wheel may be varied, but it is preferred to form the wheel of a disk having the sprocket teeth 37 and 38 secured to the periphery thereof, so that this wheel will be a single unit. One of the sprockets 37 is connected to a sprocket wheel 39 mounted upon the rear axle 20 through the medium of a chain 40, while the other sprocket 37 is connected by means of a chain 41 with a sprocket wheel 42 mounted upon a short shaft 43 having bearings in a bracket 44. This bracket is secured upon the platform 19 and extends upward through an opening 45 in the bottom of the vehicle body, so as to permit of free movement of the latter. The short shaft 43 has mounted upon each end thereof a lever 46, while hand grips 47 carried by each of the levers serve as a means for rotating the wheel 42 to drive the sprocket 37.

The sprocket 38 is connected by means of a chain 48 to the sprocket wheel 49 mounted upon a short shaft 50. This shaft is also secured in a bracket 51 extending upward through a slot or opening 52 in the bottom of the vehicle body after the manner of the bracket 44. Levers 53 and hand grips 54 carried by the shaft 50 serve as a rotating means for the latter to provide for driving the sprocket 38. The brackets 44 and 51 are located in advance of the front and rear seats 11 and 12 respectively, so that the hand grips will be in convenient reach of the occupants of the seat.

Mounted transversely of the frame 18 upon the platform 19 is a frame beam 55, one end of which carries a brake shoe 56 for contact with the tire of one of the driving wheels 21. This beam is pivotally mounted as shown at 57 and has its opposite end connected to a rod 58. The forward end of the rod 58 is connected to a brake pedal 59, while the spring 60 serves to normally prevent contact of the brake shoe 56 with the spring 21. The vehicle body has mounted therein a bell or gong 62.

The forward end of the frame 18 carries suitable headlights 63, while a tail light 64 is provided at the rear end of this frame.

The invention is susceptible of various changes in its form, proportions and minor details of construction and the right is reserved to make such changes.

Having described the invention, what is claimed is:—

1. A vehicle of the class described comprising a frame, supporting wheels carried thereby, driving mechanism mounted upon said frame, steering mechanism also mounted upon said frame, steering levers included in said steering mechanism, a spring supported body mounted upon the frame and having openings therethrough for the passage of the driving and steering mechanism and brackets secured to the frame and extending through said openings to provide for pivotally mounting the steering levers and to guide the spring supported body.

2. A vehicle of the class described comprising a frame, supporting wheels carried thereby, driving mechanism mounted upon said frame, steering mechanism also mounted upon said frame, steering levers included in the steering mechanism, a spring supported body mounted upon the frame and having openings therethrough for the passage of the driving and steering mechanism, and inverted U shaped brackets carried by the frame and extending through openings in the spring supported body to provide a guide for the latter and a pivotal mounting for the steering levers.

In testimony whereof I affix my signature.

REUBEN W. CHEEK.